United States Patent
Huo et al.

(10) Patent No.: US 10,318,175 B2
(45) Date of Patent: Jun. 11, 2019

(54) SSD WITH HETEROGENEOUS NVM TYPES

(71) Applicant: Samsung Electronics Co., Ltd., Suwon-si, Gyeonggi-do (KR)

(72) Inventors: Jianjian Huo, San Jose, CA (US); Vikas K. Sinha, Sunnyvale, CA (US); Gunneswara R. Marripudi, Fremont, CA (US); Indira Joshi, Saratoga, CA (US); Harry R. Rogers, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 15/610,489

(22) Filed: May 31, 2017

(65) Prior Publication Data
US 2018/0260136 A1   Sep. 13, 2018

Related U.S. Application Data

(60) Provisional application No. 62/468,265, filed on Mar. 7, 2017.

(51) Int. Cl.
*G06F 3/06* (2006.01)
*G06F 12/02* (2006.01)

(52) U.S. Cl.
CPC .......... *G06F 3/0611* (2013.01); *G06F 3/0656* (2013.01); *G06F 3/0659* (2013.01); *G06F 3/0685* (2013.01); *G06F 12/0253* (2013.01); *G06F 2212/1044* (2013.01); *G06F 2212/7205* (2013.01)

(58) Field of Classification Search
CPC .......... G06F 12/0246; G06F 12/0253
See application file for complete search history.

(56) References Cited

U.S. PATENT DOCUMENTS

| | | | |
|---|---|---|---|
| 3,905,023 A * | 9/1975 | Perpiglia | G06F 1/26 714/6.2 |
| 8,065,304 B2 | 11/2011 | Ross | |
| 8,255,645 B2 | 8/2012 | Ergan et al. | |
| 8,285,919 B2 | 10/2012 | Luo et al. | |
| 8,307,151 B1 * | 11/2012 | Caraccio | G06F 12/0223 711/103 |
| 8,412,688 B1 * | 4/2013 | Armangau | G06F 16/128 707/695 |

(Continued)

FOREIGN PATENT DOCUMENTS

CN   104778126 A   7/2015

OTHER PUBLICATIONS

Numonyx B.V, Sep. 23, 2009. (Year: 2009).*

*Primary Examiner* — Midys Rojas
*Assistant Examiner* — Khoa D Doan
(74) *Attorney, Agent, or Firm* — Lewis Roca Rothgerber Christie LLP

(57) ABSTRACT

A storage device. The device includes both low-latency persistent memory and higher-latency nonvolatile memory. The persistent memory may be used for write caching or for journaling. A B-tree may be used to maintain an index of write requests temporarily stored in the persistent memory. Garbage collection may be performed in the nonvolatile memory while write requests are being stored in the persistent memory.

18 Claims, 7 Drawing Sheets

(56) References Cited

U.S. PATENT DOCUMENTS

| | | | |
|---|---|---|---|
| 8,612,798 B1* | 12/2013 | Tsai | G11B 20/10527 714/6.13 |
| 8,650,150 B2 | 2/2014 | Zhao et al. | |
| 8,806,115 B1* | 8/2014 | Patel | G06F 11/1471 711/103 |
| 8,806,154 B1* | 8/2014 | Gupta | G06F 11/1448 711/156 |
| 8,874,860 B2 | 10/2014 | Huras et al. | |
| 9,136,002 B2* | 9/2015 | Lee | G11C 16/10 |
| 9,165,657 B2* | 10/2015 | Yun | G11C 16/10 |
| 9,477,620 B2* | 10/2016 | Kim | G06F 13/28 |
| 9,875,055 B1* | 1/2018 | Neppalli | G06F 3/064 |
| 9,910,618 B1* | 3/2018 | Curley | G06F 11/2092 |
| 10,007,443 B1* | 6/2018 | Rajadnya | G06F 3/0613 |
| 10,073,649 B2* | 9/2018 | DeJong | G06F 3/061 |
| 2003/0005233 A1* | 1/2003 | Stewart | G06F 12/123 711/136 |
| 2003/0031052 A1* | 2/2003 | Roohparvar | G11C 16/08 365/185.11 |
| 2003/0074526 A1* | 4/2003 | Kanamaru | G06F 12/0868 711/113 |
| 2003/0093598 A1* | 5/2003 | Park | H04M 1/72527 710/63 |
| 2003/0131173 A1* | 7/2003 | Cassidy | G06F 13/4221 710/308 |
| 2004/0103245 A1* | 5/2004 | Fukusawa | G11B 20/10527 711/113 |
| 2004/0148470 A1* | 7/2004 | Schulz | G06F 12/0862 711/137 |
| 2005/0198062 A1* | 9/2005 | Shapiro | G06F 16/2282 |
| 2006/0248259 A1* | 11/2006 | Ryu | G06F 3/0613 711/1 |
| 2007/0002780 A1* | 1/2007 | Pessi | H03M 7/3088 370/261 |
| 2007/0118702 A1* | 5/2007 | Gupta | H04L 49/557 711/154 |
| 2007/0198796 A1* | 8/2007 | Warren, Jr. | G06F 12/0804 711/165 |
| 2007/0255891 A1* | 11/2007 | Chow | G06F 12/0804 711/103 |
| 2008/0005593 A1* | 1/2008 | Wyatt | G06F 1/3228 713/300 |
| 2008/0034174 A1* | 2/2008 | Traister | G06F 12/0246 711/159 |
| 2008/0055326 A1* | 3/2008 | Du | G06T 1/60 345/553 |
| 2008/0084782 A1* | 4/2008 | Fukada | G11C 11/22 365/239 |
| 2008/0172515 A1* | 7/2008 | Croxford | G06F 13/1684 711/5 |
| 2008/0270690 A1* | 10/2008 | English | G06F 3/0613 711/114 |
| 2009/0034377 A1* | 2/2009 | English | G06F 3/0613 369/47.13 |
| 2010/0037005 A1* | 2/2010 | Kim | G06F 12/0246 711/103 |
| 2010/0091553 A1* | 4/2010 | Lee | G11C 13/0004 365/148 |
| 2010/0106889 A1* | 4/2010 | Manning | G06F 11/2069 711/103 |
| 2010/0191897 A1* | 7/2010 | Zhang | G06F 12/0246 711/103 |
| 2011/0022574 A1* | 1/2011 | Hansen | G06F 11/2097 707/698 |
| 2011/0119456 A1* | 5/2011 | Ipek | G06F 11/1008 711/162 |
| 2011/0145477 A1* | 6/2011 | Rudelic | G11C 16/22 711/103 |
| 2011/0296085 A1* | 12/2011 | Eleftheriou | G06F 12/0246 711/103 |
| 2012/0089877 A1* | 4/2012 | Takeuchi | G06F 3/0613 714/719 |
| 2012/0096332 A1* | 4/2012 | Furno | G06F 11/1068 714/773 |
| 2012/0117303 A1* | 5/2012 | Carannante | G06F 12/0246 711/103 |
| 2012/0131261 A1* | 5/2012 | Ferrari | G06F 12/0246 711/103 |
| 2012/0311262 A1* | 12/2012 | Franceschini | G06F 0/802 711/118 |
| 2013/0086312 A1* | 4/2013 | Miura | G06F 12/0246 711/103 |
| 2013/0265826 A1* | 10/2013 | Lee | G11C 16/10 365/185.17 |
| 2013/0318283 A1 | 11/2013 | Small et al. | |
| 2014/0052946 A1* | 2/2014 | Kimmel | G06F 12/02 711/159 |
| 2014/0136767 A1* | 5/2014 | Lee | G06F 12/0246 711/103 |
| 2014/0181362 A1* | 6/2014 | Choi | G06F 3/0604 711/102 |
| 2014/0258591 A1* | 9/2014 | Dunn | G06F 12/0866 711/103 |
| 2014/0279909 A1* | 9/2014 | Sudarsanam | G06F 9/45558 707/639 |
| 2014/0280760 A1* | 9/2014 | Hurst | H04L 65/60 709/219 |
| 2015/0066988 A1* | 3/2015 | Cadambi | G06F 7/36 707/797 |
| 2015/0113100 A1* | 4/2015 | Tweedale | H04L 65/60 709/219 |
| 2015/0149704 A1 | 5/2015 | Lee et al. | |
| 2015/0242343 A1* | 8/2015 | Atzmon | G06F 13/1673 710/267 |
| 2015/0286590 A1* | 10/2015 | Ou | G06F 13/1642 711/148 |
| 2016/0034225 A1 | 2/2016 | Yoon et al. | |
| 2016/0134501 A1* | 5/2016 | Timms | H04L 47/34 370/252 |
| 2016/0179375 A1 | 6/2016 | Kirvan et al. | |
| 2016/0179412 A1* | 6/2016 | Camp | G06F 12/0246 711/103 |
| 2016/0224588 A1 | 8/2016 | Harijono et al. | |
| 2017/0068482 A1* | 3/2017 | Ramalingam | G06F 3/0647 |
| 2017/0123814 A1* | 5/2017 | Seo | G06F 3/0611 |
| 2017/0168948 A1* | 6/2017 | Delgado | G06F 12/0864 |
| 2017/0242785 A1* | 8/2017 | O'Krafka | G06F 12/0246 |
| 2017/0285961 A1* | 10/2017 | Li | G06F 3/0605 |
| 2018/0088843 A1* | 3/2018 | Shallal | G06F 12/0238 |
| 2018/0095872 A1* | 4/2018 | Dreier | G06F 3/0689 |
| 2018/0113640 A1* | 4/2018 | Fernandez | G06F 3/0634 |
| 2018/0121121 A1* | 5/2018 | Mehra | G06F 3/0604 |
| 2018/0173442 A1* | 6/2018 | Kirkpatrick | G06F 3/0613 |

* cited by examiner

SSD WITH HETEROGENEOUS NVM TYPES

CROSS-REFERENCE TO RELATED APPLICATION(S)

The present application claims priority to and the benefit of U.S. Provisional Application No. 62/468,265, filed Mar. 7, 2017, entitled "SSDS WITH HETEROGENEOUS NVM TYPES", the entire content of which is incorporated herein by reference.

FIELD

One or more aspects of embodiments according to the present invention relate to data storage, and more particularly to a storage device with heterogeneous storage.

BACKGROUND

Enterprise storage architectures may use a battery backed nonvolatile random access memory (NVRAM) or nonvolatile dual in-line memory module (NVDIMM) device for logging incoming write input/output requests (IO requests). The IO requests my eventually be flushed to lower performance nonvolative data storage media. NVRAM/NVDIMM solutions may be used as a staging area to reduce write latency. However, such solutions may have limited functionality due to having small capacity, increased complexity (e.g., related to central processing unit (CPU) asynchronous dynamic random access memory (DRAM) refresh (ADR) synchronization), and the need to include a battery in the system. Moreover, the performance of such a system may be limited by the number of NVRAMs and/or NVDIMMs that a system can include, and in some applications, the inclusion of batteries may be unacceptable, due to system environment constraints, rendering a battery backed solution unworkable.

Further complicating the use of battery backed NVRAM or NVDIMM is the possible need to size the NVDIMMs and/or NVRAMs to trade off cost against high write latency jitter. Thus, there is a need for an improved alternative to a storage system including battery backed NVRAM or NVDIMM.

SUMMARY

Aspects of embodiments of the present disclosure are directed toward a storage device. The device includes both low-latency persistent memory and higher-latency nonvolatile memory. The persistent memory may be used for write caching or for journaling. A B-tree may be used to maintain an index of write requests temporarily stored in the persistent memory. Garbage collection may be performed in the nonvolatile memory while write requests are being stored in the persistent memory.

According to an embodiment of the present invention there is provided a storage device including: a first controller; a first memory bank including a plurality of slow nonvolatile memory cells; a second memory bank including a plurality of fast persistent memory cells; and a storage interface, the first controller being configured to respond to input output requests received through the storage interface; each of the plurality of slow nonvolatile memory cells being: at least ten times greater in read latency than any of the fast persistent memory cells; and at least ten times greater in write latency than any of the fast persistent memory cells, the storage device including at least ten times as many of the slow nonvolatile memory cells as of the fast persistent memory cells.

In one embodiment, a page size of the second memory bank is equal to a block size of the second memory bank.

In one embodiment, each of the slow nonvolatile memory cells is: at least 100 times greater in read latency than any of the fast persistent memory cells; and at least 100 times greater in write latency than any of the fast persistent memory cells.

In one embodiment, the storage interface is selected from the group consisting of: Peripheral Component Interconnect Express (PCIe) interfaces, remote direct memory access (RDMA) over Ethernet interfaces, Serial Advanced Technology Attachment (SATA) interfaces, Fibre Channel interfaces, Serial Attached SCSI (SAS) interfaces, and Non Volatile Memory Express (NVMe) interfaces.

In one embodiment, the storage device has a form factor selected from the group consisting of a 3.5 inch hard drive form-factor, and a 2.5 inch hard drive form-factor.

In one embodiment, the storage device is configured, upon receiving a write request through the storage interface, to: first, store the write request in the second memory bank; second, execute the write request; and third, delete the write request from the second memory bank.

In one embodiment, a portion of the second memory bank is configured to operate as a circular buffer, and the storage device is configured, upon receiving a write request through the storage interface, to store the write request in the circular buffer.

In one embodiment, the storage device is further configured upon receiving a write request through the storage interface to store an index entry for the write request in a B-tree index of write requests.

In one embodiment, the storage device is configured to concurrently: perform garbage collection in the first memory bank; and store write requests in the circular buffer.

In one embodiment, the storage device includes a second controller configured to control operations in the first memory bank, and wherein the storage device is configured to: calculate a future buffering period, as the ratio of: an amount of free space in the circular buffer, and a maximum write rate for the second memory bank; and instruct the second controller to perform garbage collection operations during an interval of time having a length equal to the future buffering period.

In one embodiment, the storage device includes a second controller configured to control operations in the first memory bank, and wherein the storage device is configured to: calculate a future buffering period, as the ratio of: an amount of free space in the circular buffer, and a maximum write rate for the second memory bank; and when a dirty block ratio of the first memory bank exceeds a first threshold, instruct the second controller to perform garbage collection operations during an interval of time having a length equal to the future buffering period.

In one embodiment, the storage device is further configured to: recalculate the future buffering period during the garbage collection operations, and when the recalculated future buffering period exceeds the previously calculated future buffering period, notify the second controller of the recalculated future buffering period.

In one embodiment, the storage device is configured, upon receipt of a write request for a location in the first memory bank, when the B-tree contains a previously made index entry, and the second memory bank contains a corresponding write request, for the same location in the first memory bank: to store the write request in the circular buffer; to store an index entry for the write request in the B-tree index; to delete the previously made index entry from the circular buffer; and to delete the write request corresponding to the previously made index entry in the circular buffer.

In one embodiment, the storage device is configured, upon receipt of a read request for a location in the first memory bank, when the B-tree contains a previously made index entry for the same location in the first memory bank: to respond to the read request with data from the circular buffer.

In one embodiment, the storage device is configured, when an empty fraction of the circular buffer falls below a threshold, to delay sending a command completion through the storage interface.

According to an embodiment of the present invention there is provided a method for operating a storage system, the storage system including a storage device including: a first memory bank including a plurality of slow nonvolatile memory cells; a second memory bank including a plurality of fast persistent memory cells; and a storage interface, each of the plurality of slow nonvolatile memory cells being: at least ten times greater in read latency than any of the fast persistent memory cells; and at least ten times greater in write latency than any of the fast persistent memory cells, the storage device including at least ten times as many of the slow nonvolatile memory cells as of the fast persistent memory cells, the method including: receiving a write request through the storage interface; and storing the write request in a circular buffer in the second memory bank.

In one embodiment, the method includes: performing garbage collection in the first memory bank while storing the write request in the circular buffer.

In one embodiment, the method includes: storing an index entry for the write request in a B-tree index of write requests.

In one embodiment, the method includes: before storing the write request in the circular buffer, calculating a future buffering period, as the ratio of: an amount of free space in the circular buffer, and a maximum write rate for the second memory bank, wherein the performing of the garbage collection includes performing garbage collection during an interval of time having a length equal to the future buffering period.

According to an embodiment of the present invention there is provided a storage system, including: a plurality of storage devices, each including: a first memory bank including a plurality of slow nonvolatile memory cells; a second memory bank including a plurality of fast persistent memory cells; and a storage interface, each of the plurality of slow nonvolatile memory cells being: at least ten times greater in read latency than any of the fast persistent memory cells; and at least ten times greater in write latency than any of the fast persistent memory cells, the storage device including at least ten times as many of the slow nonvolatile memory cells as of the fast persistent memory cells, the system being configured to pool the respective second memory banks to form a virtual second memory bank.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of an SSD with heterogeneous NVM types provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
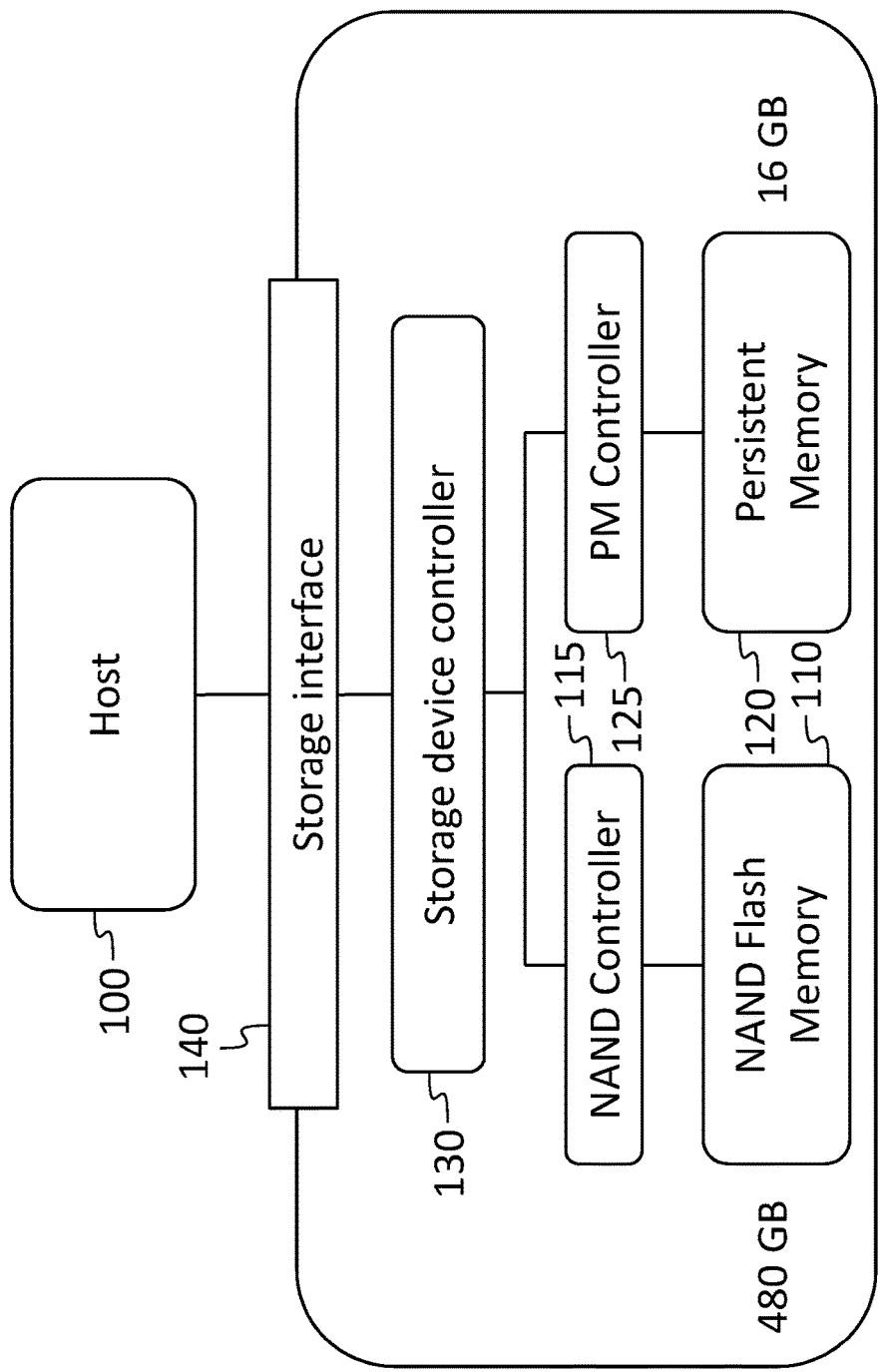
FIG. 1 is a block diagram of a host and a storage device, according to an embodiment of the present invention.

Referring to FIG. 1, in some embodiments, a host 100 is connected to a storage device (e.g., a heterogeneous SSD) including two banks of memory: a bank of relatively slow nonvolatile memory 110 (which may be NAND flash memory configured to act as a main backing store) and a bank of relatively fast persistent memory 120. The persistent memory 120 may also be nonvolatile memory and is referred to herein as "persistent memory" primarily to distinguish it from the relatively slow nonvolatile memory 110. As used herein, the terms "nonvolatile memory", "persistent storage" and "persistent memory" all refer to memory capable of retaining stored data without having power supplied to it.

Persistent memories, such as phase change memory, Z-NAND™ (available from Samsung), 3D X-POINT™ (available from Intel and Micron Technology), Phase Change Memory, Resistive RAM, STTRAM, and the like, are used to provide significantly faster access and low IO latencies. A NAND controller 115 provides an interface to, and controls, the nonvolatile memory 110, and a persistent memory controller 125 provides an interface to, and controls, the persistent memory 120. A storage device controller 130, connected to a storage interface 140 responds to IO requests received from the host 100 through the storage interface 140.

A "memory cell", as used herein, refers to the smallest set of elements capable of storing data. For example, for NAND flash, a storage cell may be a single floating gate transistor, and it may store one bit of data (if it is configured as a single-level cell) or several bits of data if it is configured as a multi-level cell.

The persistent memory 120 may be ten times or 100 times or more faster than the nonvolatile memory 110, e.g., (i) the read latency of the nonvolatile memory 110 may be ten times or 100 times or more greater than the read latency of the persistent memory 120 and/or (ii) the write latency of the nonvolatile memory 110 may be ten times or 100 times or more greater than the write latency of the persistent memory 120. The block size of the persistent memory 120 may be the same as the page size of the persistent memory 120, making garbage collection unnecessary in the persistent memory 120. As used herein, a "page" is a quantity of memory corresponding to the smallest number of cells that may be written (or programmed) in one operation. If each cell stores one bit (as in the case of NAND flash using single-level cells), a page size of 2048 bytes corresponds to 16,384 cells (2048×8 being 16,384). A "block" is a quantity of memory corresponding to the smallest number of cells that may be erased in one operation.

In some embodiments, the storage device conforms to a 3.5 inch hard drive form-factor (or large form factor (LFF)) standard. In other embodiments it conforms to a 2.5 inch hard drive form-factor (or small form factor (SFF)) standard. In other embodiments, the storage device conforms to an M.2 form factor. In some embodiments, derivatives of these form factors are used, e.g., SFF contemplates hot-plug/hot-swap by specification, but LFF does not (accordingly, in some embodiments the storage device conforms to a hot-swappable derivative of the LFF standard). The storage interface 140 may include a connector and a protocol customarily used by a host and storage device to exchange storage requests and responses. The connector and protocol may conform to, for example, Peripheral Component Interconnect Express (PCIe), remote direct memory access (RDMA) over Ethernet, Serial Advanced Technology Attachment (SATA), Fibre Channel, Serial Attached SCSI (SAS), Non Volatile Memory Express (NVMe), or to a more general-purpose interface such as Ethernet or Universal Serial Bus (USB). The storage interface 140 is used by the host 100 to communicate with the storage device. Input output (IO) requests such as data read and data write requests, as well as various media management requests (e.g., Identify, Get Log, etc.) may be sent to the storage device by the host over the storage interface 140. The same interface may be used by the storage device to perform data transfers to and from internal memory in the host 100.

The persistent memory 120 may be used for write caching to accelerate access to the nonvolatile memory 110 and to reduce overall IO latency. The capacity of the persistent memory 120 in the heterogeneous SSD may be smaller (e.g., 16 GB) than the capacity of the nonvolatile memory 110 (e.g., 480 GB) in a heterogeneous SSD. In some embodiments, the capacity of the nonvolatile memory 110 (e.g., of the NAND flash memory) is presented to the host software as the capacity of the heterogeneous SSD. The low-latency/high-performance persistent memory 120 is not included in the SSD capacity exposed to the host software.

In the heterogeneous SSD, NAND Flash memory is configured to act as the main backing store which is responsible for storing the data from SSD users (e.g., from the host 100). The capacity of this SSD is the same as the available memory space in the nonvolatile memory 110 (e.g., the NAND flash memory space), and the logical block address (LBA) mapping is simply linear (or managed by the flash translation layer (FTL)). The persistent memory 120 may function as a write-ahead log (WAL); e.g., it may buffer all the coming writes temporary and write them back to backing store (e.g., to the nonvolatile memory 110) in the background.

Figure 2:
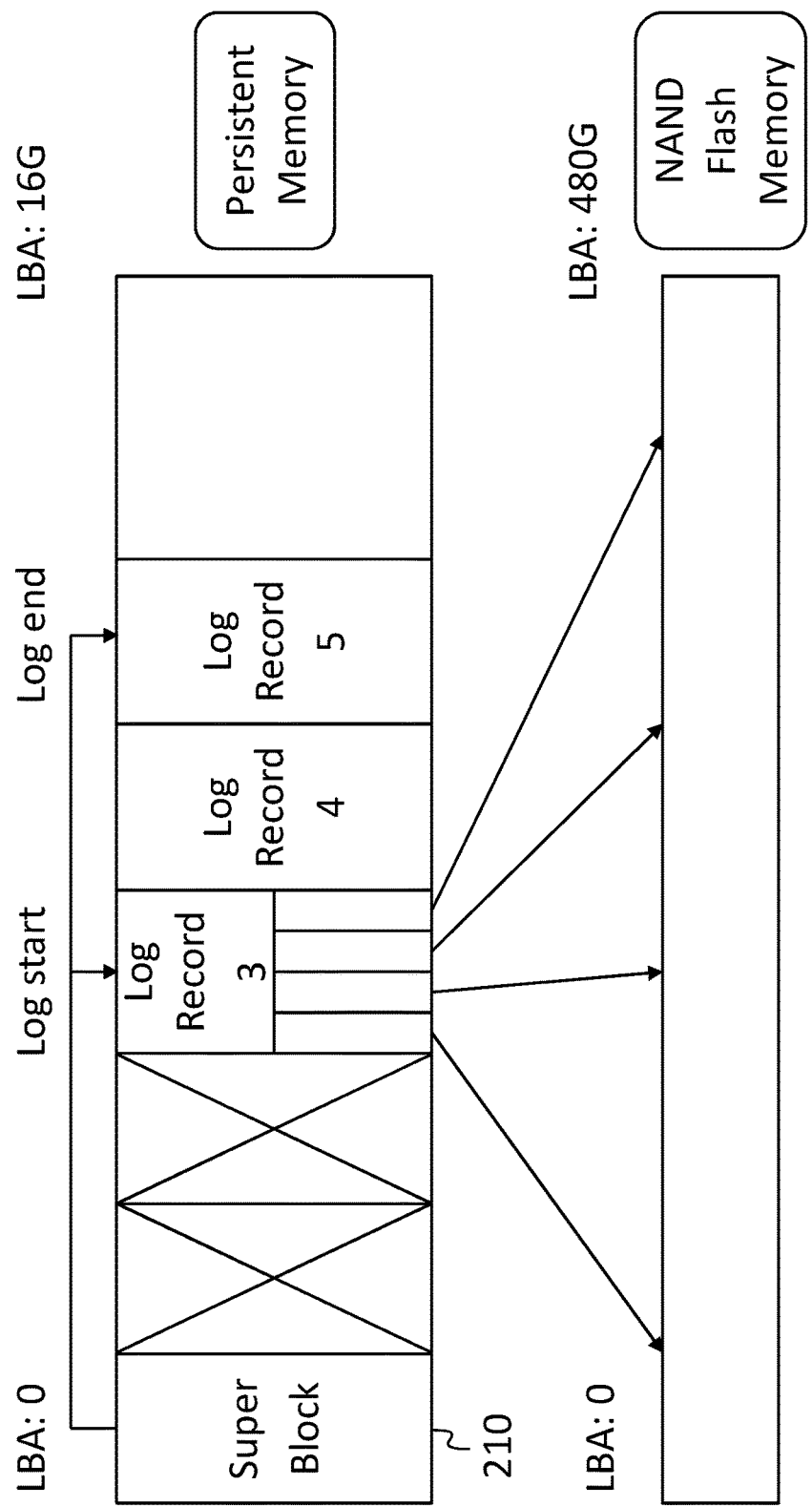
FIG. 2 is memory diagram, according to an embodiment of the present invention.

FIG. 2 illustrates, in some embodiments, the internal data organization in the persistent memory 120 and how it buffers and writes back incoming writes. The persistent memory 120 is used as a circular buffer; each new write request is stored in the work-in-progress log record which is either a new log record or the current partially full log record. Log records are fixed size data chunks (e.g. 256 kB) each of which includes (e.g., consists of) a plurality of smaller write IO requests. The requests are filled into persistent memory LBA space sequentially; when the end of the persistent memory 120 is reached, the location being written (which may be identified by a write pointer) wraps around to the beginning of the circular buffer, which, if the buffer is not full, has free LBA space. The persistent memory super block 210 logs the start and end of valid log records. A background flushing process writes back valid and complete log records into the backing store (i.e., into the nonvolatile memory 110), and, when it does so, frees the corresponding persistent memory space. In this manner the persistent memory 120 embedded in a heterogeneous SSD may be used for journaling or write-ahead-logging (WAL) functionality, and these operations may be transparent to host software.

In some embodiments, the heterogeneous SSD also maintains an in-memory B-tree index (e.g., i the persistent memory 120) of all the buffered write requests. This index records the mapping of the LBA of each original write request to the specific log records which store this write request. The index serves two purposes, one of which is to remove earlier received, and not yet executed write requests to the same LBA address, to avoid superfluous writes to the main backing store (e.g., to the nonvolatile memory 110). Another purpose of the index is to serve those read requests which should be served using the data from persistent memory, for example, in situations in which a write request to the same LBA is pending and has not yet been executed on the nonvolatile memory 110. As used herein, a B-tree refers to a self-balancing tree data structure that keeps data sorted and allows searches, sequential access, insertions, and deletions in logarithmic time. As used herein, "executing" (or "flushing") a write request (including data to be written and a logical block address (LBA) identifying the location to which the data are to be written) refers to storing data to be written at the physical address, in nonvolatile memory 110, corresponding (according to one or more tables maintained by the flash translation layer) to the LBA.

Figure 3:
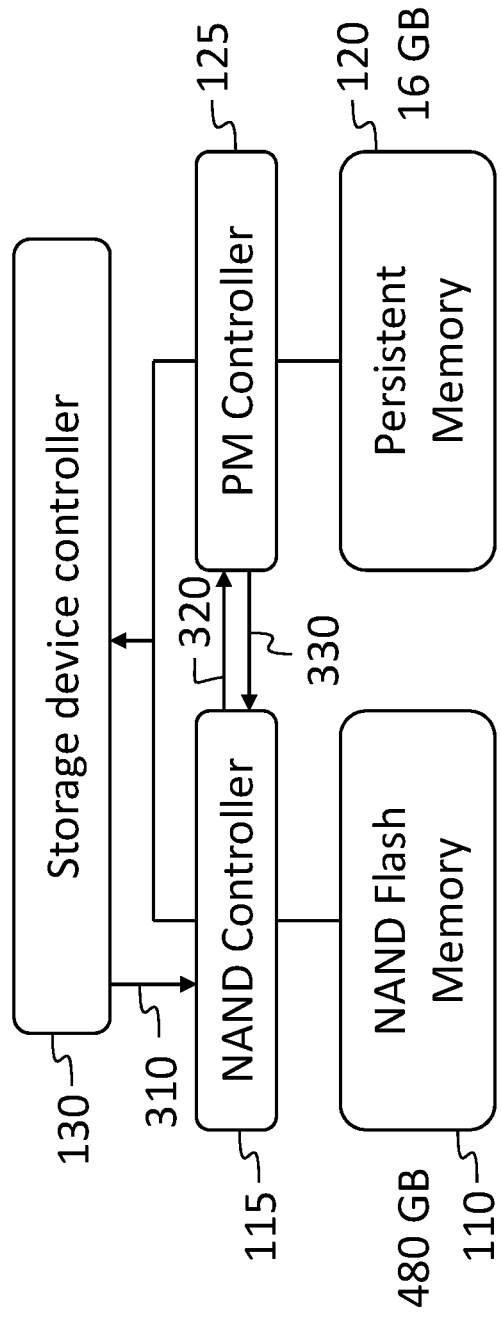
FIG. 3 is a block diagram of a storage device, according to an embodiment of the present invention.

Referring to FIG. 3, in some embodiments, the heterogeneous SSD performs coordinated background operations such as NAND flash garbage collection (which, when performed as a coordinated background operation may be referred to as "smart garbage collection"). The write-ahead log may at some times write back buffered write requests to the main backing store, and at other times it may buffer incoming write requests from the host. While the write-ahead log is buffering incoming write requests from the host, the heterogeneous SSD may issue a smart garbage collection request to the NAND controller. As used herein, garbage collection refers to one or more operations of moving one or more valid pages from a block containing one or more invalid pages to one or more other blocks, and erasing the block.

The operation may proceed as follows. The persistent memory controller 125 may estimate the future buffering period (FBP) without data write-back using the following equation:

$$FBP = Available\_PM\_SPACE / PM\_MAX\_THROUGHPUT$$

where Available_PM_SPACE is the amount of persistent memory 120 that is available for buffering, and PM_MAX_THROUGHPUT is the maximum rate at which the persistent memory 120 may be filled by write requests from the host. The storage device controller 130 then checks the NAND Flash memory dirty block ratio (i.e., the dirty block ratio in the nonvolatile memory 110) and if the NAND Flash memory dirty block ratio is higher than a configurable threshold, the storage device controller 130 then issues (as indicated by arrow 310) a smart garbage collection request to the NAND controller 115, instructing the NAND controller 115 to perform garbage collection to the extent possible within an initial period of time having a length equal to the FBP. During the garbage collection operation, the storage device controller 130 may periodically recalculate the FBP (which may change if the actual rate at which write requests received from the host are filling the persistent memory 120 is less than the maximum possible rate), and notify the NAND controller 115 of any such increase in the FBP during the garbage collection operation, enabling the NAND controller 115 to make full use of the opportunity to perform garbage collection. The NAND controller 115 may notify (as indicated by arrow 320) the persistent memory controller 125 when the garbage collection operation has terminated (either at the end of the FBP, or, as a result of being completed earlier, before the end of the FBP), and write-back of data from the persistent memory 120 to the nonvolatile memory 110 may then resume (as indicated by arrow 330), under the control of the storage device controller 130, the persistent memory controller 125, and the NAND controller 115. As used herein, the "dirty block ratio" is the ratio of (i) the number of blocks in the nonvolatile memory 110 each containing more than a set number of dirty pages, to (ii) the number of blocks in the nonvolatile memory 110.

Figure 4:
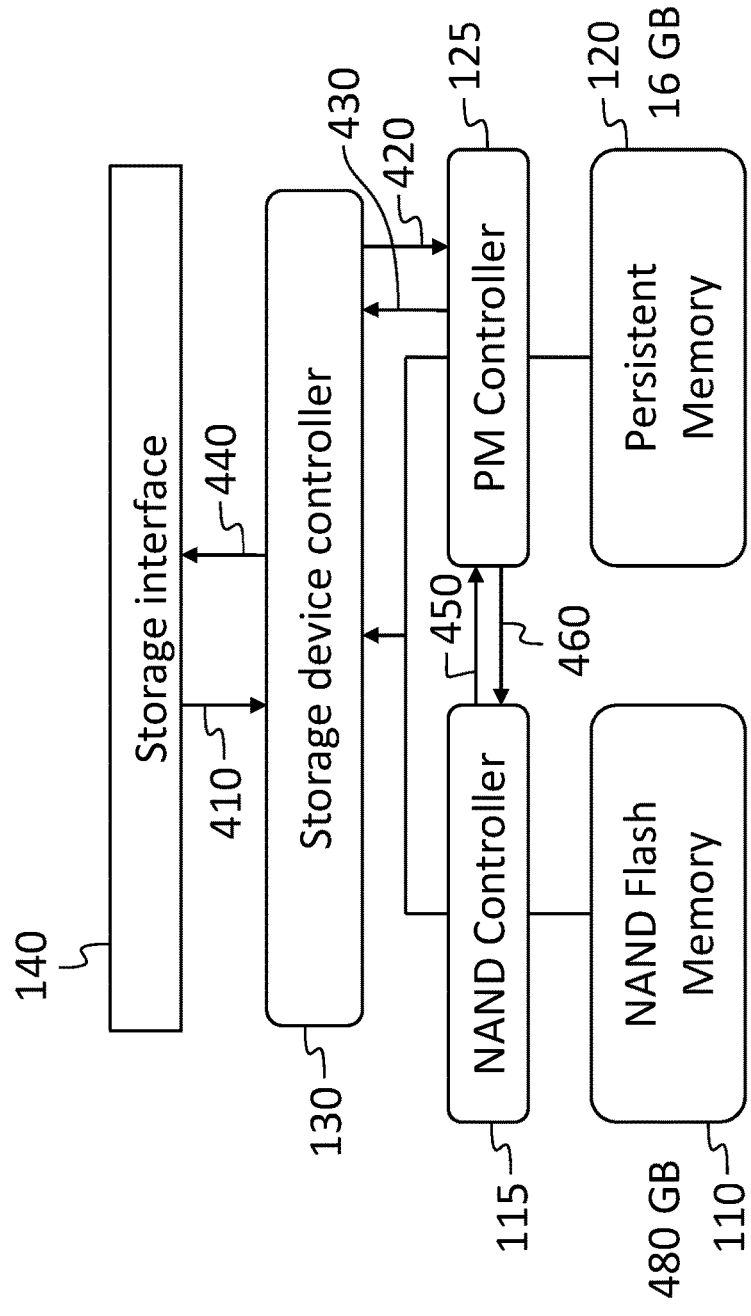
FIG. 4 is a block diagram of a storage device, according to an embodiment of the present invention.

FIG. 4 illustrates how a heterogeneous SSD with a write-ahead log implemented in persistent memory 120 may handle incoming write IO requests along with coordinated NAND flash garbage collection. When a new write request is received, e.g., through the storage interface 140 (as indicated by arrow 410), the storage device controller 130 submits (as indicated by arrow 420) the write request to the persistent memory controller 125, which stores a new log record in the persistent memory 120, and returns (as indicated by arrow 430) an acknowledgement to the storage device controller 130. The storage device controller 130 then returns (as indicated by arrow 440) an acknowledgement to the upper layer (e.g., to the host software, through the storage interface 140). Simultaneously, smart garbage collection operations may be conducted by the NAND controller 115 in the nonvolatile memory 110. Background write-back operations of valid blocks (as indicated by arrow 450) may also take place, resulting in write data being stored in the nonvolatile memory 110, and each write-back being acknowledged (as indicated by arrow 460).

In some embodiments, when a new log record updates the current block entry in the B-tree, the storage device controller 130 also marks the old block in its log record invalid, to prevent the old block from subsequently being written back to the nonvolatile memory 110 by the background write back process. In some embodiments, the storage device controller 130 uses a write throttling mechanism (e.g., it may delay sending a command completion to the host after receiving a write request from the host) if and when the write back process to the nonvolatile memory 110 is unable to keep up with user writes (e.g., with write requests received from the host). This condition may be detected, for example, by determining that the empty fraction of the circular buffer has fallen below a threshold.

For large sequential IO operations that are not latency sensitive, the persistent memory controller 125 may choose to redirect IOs directly to the NAND controller 115 without staging the data in its local buffers.

Figure 5:
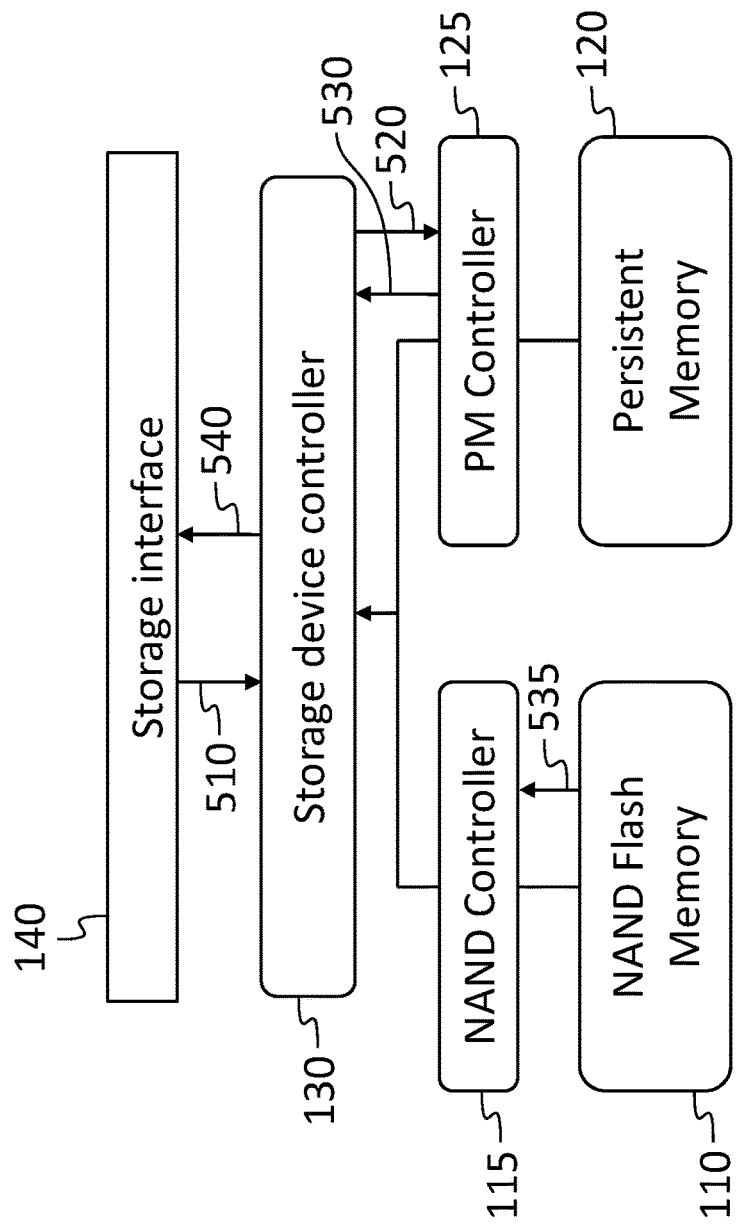
FIG. 5 is a block diagram of a storage device, according to an embodiment of the present invention.

Referring to FIG. 5 when a read request is received (as indicated by arrow 510), the storage device controller 130 looks up the logical block address of the read request in the B-tree (as indicated by arrow 520), to determine whether the data to be read are in the persistent memory 120. If the data to be read are in the persistent memory 120, then the persistent memory controller 125 reads the data from the persistent memory 120 and returns the data (as indicated by arrow 530) to the storage device controller 130. Otherwise, the data are read (as indicated by arrow 535) from the nonvolatile memory 110 and returned to the storage device controller 130. In either case, the storage device controller 130 then sends (as indicated by arrow 540) a response (e.g., to the host) including the data requested in the read request.

Figure 6:
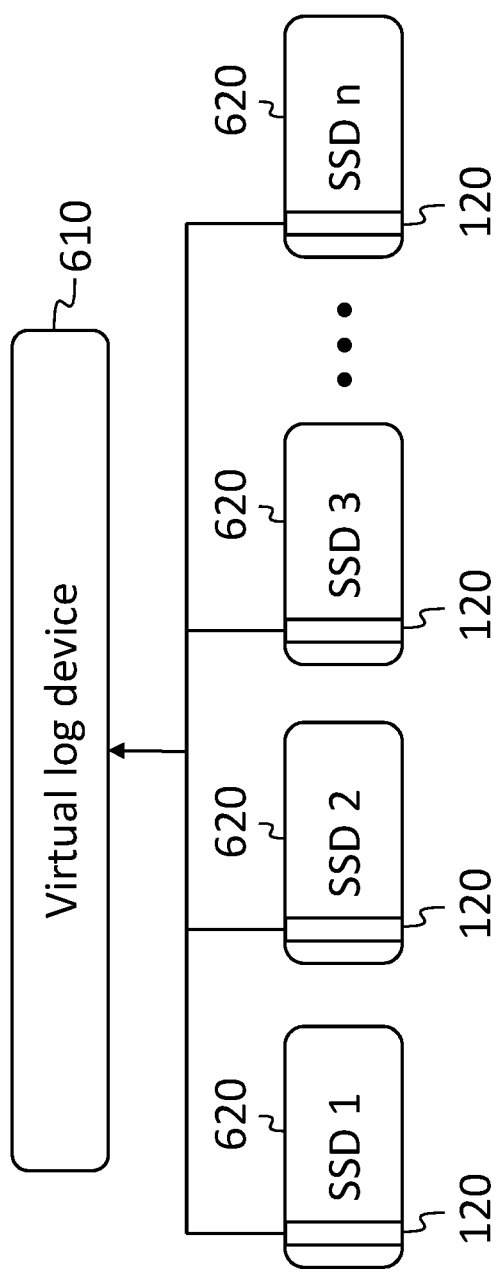
FIG. 6 is a block diagram of a storage system, according to an embodiment of the present invention.

In some embodiments, as mentioned above, a heterogeneous SSD has a smaller capacity of persistent memory 120 and a larger capacity of nonvolatile memory 110. In applications in which the smaller capacity of persistent memory 120 may become a limitation, a larger virtual block device (which operates as a virtual bank of low-latency persistent memory) may be created by pooling the respective persistent memory banks of a plurality of heterogeneous SSDs, as illustrated in FIG. 6, using persistent memory 120 from each of the plurality of heterogeneous SSDs 620. In some embodiments, the virtual log device 610 presents a logical device to the host software. The virtual log device 610 may be an instantiation of a software module or a logical representation of heterogeneous SSDs 620 that can communicate with each other using peering capabilities.

Figure 7:
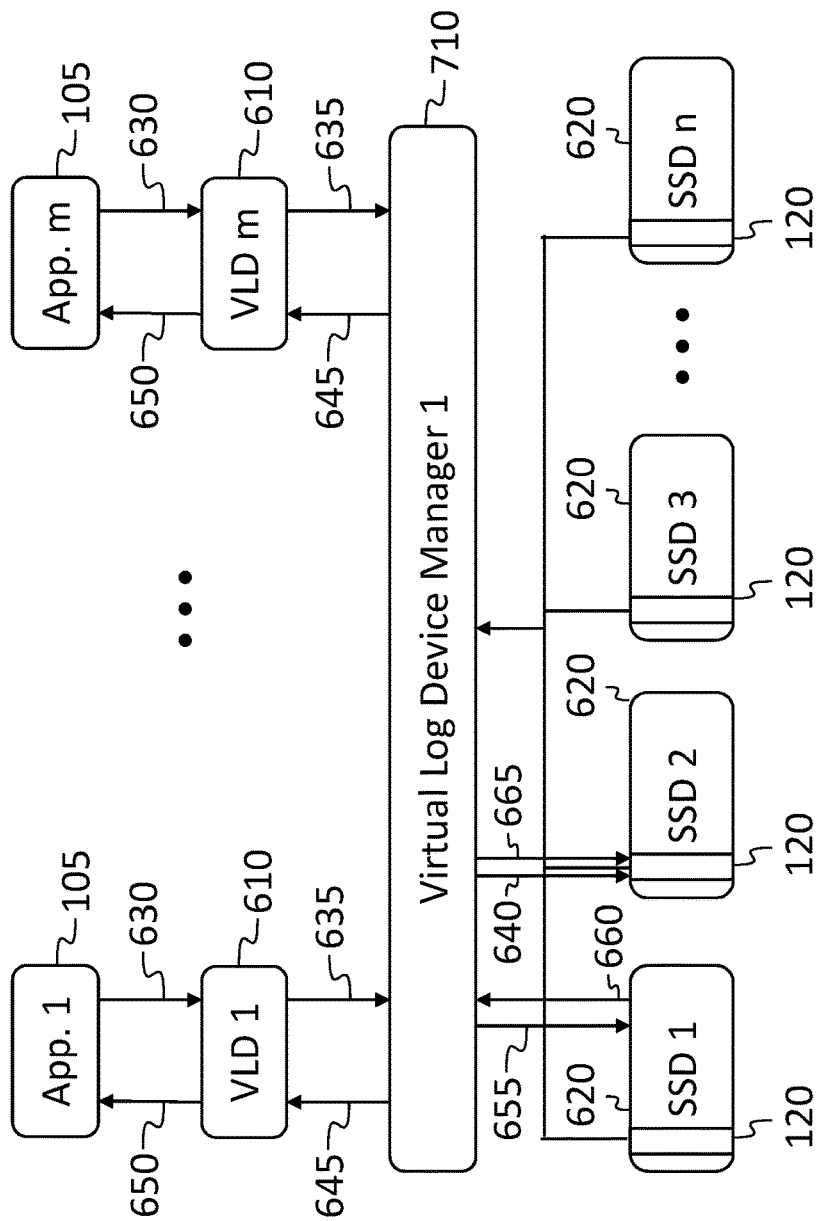
FIG. 7 is a block diagram of a storage system, according to an embodiment of the present invention.

FIG. 7 illustrates the IO flow for a write request that is targeted at a specific heterogeneous SSD and that goes through a virtual log device 610, the virtual log device 610 being distributed across multiple heterogeneous SSDs 620. The flow for a write operation is illustrated. When a new write request arrives (as indicated by arrow 630) at a first virtual log device 610 (labelled VLD 1) of a heterogeneous SSD, the first virtual log device 610 submits (as indicated by arrow 635) the write request to the virtual log device manager 710. The virtual log device manager 710 then selects a location in persistent memory 120 on one or more of the heterogeneous SSDs 620, based on bandwidth and capacity requirements of the VLD 610 as specified by the application 105, stores (as indicated by arrow 640) a new record in the selected location in persistent memory 120, and returns (as indicated by arrow 645) an acknowledgement to the first virtual log device 610 (labelled VLD 1) which then returns (as indicated by arrow 650) the acknowledgement to the upper layer (e.g., to the host application). Subsequently, or concurrently, the virtual log device manager 710 flushes (as indicated by arrow 655) the write request to the nonvolatile memory 110 of the target heterogeneous SSD, which returns (as indicated by arrow 660) an acknowledgement to the virtual log device manager 710. Finally the virtual log device manager 710 removes (as indicated by arrow 665) the flushed log record.

The location in persistent memory 120 selected by the virtual log device 610 may or may not be in the persistent memory 120 of the specific heterogeneous SSD targeted for the write request. The factors that the virtual log device 610 may take into account in making the selection may include, for example (i) the current workload on the targeted SSD, (ii) the amount of free space left in the persistent memory 120 of each of the heterogeneous SSDs 620, and (iii) the state of any background operations on the persistent memory 120 of each of the heterogeneous SSDs 620, that could impact the IO latency.

For read operations, the virtual log device 610 may perform a lookup of the requested data in the persistent memory 120; if the data are present in the persistent memory 120, the virtual log device 610 returns the requested data from the persistent memory 120 on one of the heterogeneous SSDs 620. If the requested data are not present in the persistent memory 120, the requested data are directly read from the nonvolatile memory 110 of the heterogeneous SSD on which they are stored. Although FIGS. 6 and 7 show only one virtual log device, the invention is not limited to such embodiments and in some embodiments multiple virtual log devices are formed from a group of heterogeneous SSDs.

Some applications, such as certain file systems, certain databases, or volume managers use a conventional, host-visible log device to implement a journal or write-ahead log. These applications may either not execute at all, or not perform optimally if such a log device is not provided or is provided in a manner that is transparent to the storage software stack on systems running these applications. Accordingly, some embodiments provide the following methods to support this class of applications.

A Log Device Map method may allow the low-latency persistent memory 120 of a heterogeneous SSD to be directly addressable in the IO path by the application and/or operating system running on the host connected to the heterogeneous SSD. The Map function may cause the low-latency device to be detected by the host operating system storage software stack as a separate storage device suitable for use as a journal or log device. The Map function may present either the entire addressable space of the persistent memory 120 of the heterogeneous SSD, or a portion thereof.

In another embodiment, a Map function is not used; instead the host is allowed the ability to selectively place data blocks either in the low-latency persistent memory 120, or in the nonvolatile memory 110 (i.e., the backing storage) of a heterogeneous SSD, while still continuing to access and use a single storage device corresponding to the consolidated, heterogeneous SSD. In such an embodiment, a Log Device Partition method may allow only data blocks with offsets (or LBAs) less than a designated offset (a "Partition offset") to be placed in the low-latency persistent memory 120 of the heterogeneous SSD. To write to its write-ahead log, the application may then simply assume that its log size is less than or equal to the size implied by the Partition offset and starts at offset 0. Data blocks that are intended for the main backing store (i.e., for the nonvolatile memory 110 of the heterogeneous SSD) may accordingly be sent using an offset exceeding the Partition offset, which may cause the heterogeneous SSD to dispatch those blocks directly to the nonvolatile memory 110 of the heterogeneous SSD.

Each of the NAND controller 115, the storage device controller 130, and the persistent memory controller 125 may be, or be part of, a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB. In some embodiments at least one controller of the NAND controller 115, the storage device controller 130, and the persistent memory controller 125 is implemented in software executing on a processing circuit, which may be the same processing circuit, or a separate processing circuit from that implementing (or executing) the other controllers of the NAND controller 115, the storage device controller 130, and the persistent memory controller 125.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an SSD with heterogeneous NVM types have been specifically described and illustrated herein, many modifications and variations will be apparent to those skilled in the art. Accordingly, it is to be understood that an SSD with heterogeneous NVM types constructed according to principles of this invention may be embodied other than as specifically described herein. The invention is also defined in the following claims, and equivalents thereof.

What is claimed is:

1. A storage device comprising:
   a first controller;
   a first memory bank including a plurality of slow nonvolatile memory cells;
   a second memory bank including a plurality of fast persistent memory cells; and
   a storage interface,
   the first controller being configured to respond to input output requests received through the storage interface;
   each of the plurality of slow nonvolatile memory cells being:
     at least ten times greater in read latency than any of the fast persistent memory cells; and
     at least ten times greater in write latency than any of the fast persistent memory cells,
   the storage device including at least ten times as many of the slow nonvolatile memory cells as of the fast persistent memory cells,
   wherein a portion of the second memory bank is configured to operate as a circular buffer,
   wherein the storage device is configured, upon receiving a write request through the storage interface, to store the write request in the circular buffer, and
   wherein the storage device is further configured upon receiving the write request through the storage interface to store an index entry for the write request in a B-tree index of write requests.

2. The storage device of claim 1, wherein a page size of the second memory bank is equal to a block size of the second memory bank.

3. The storage device of claim 1, wherein each of the slow nonvolatile memory cells is:
   at least 100 times greater in read latency than any of the fast persistent memory cells; and
   at least 100 times greater in write latency than any of the fast persistent memory cells.

4. The storage device of claim 1, wherein the storage interface is selected from the group consisting of: Peripheral Component Interconnect Express (PCIe) interfaces, remote direct memory access (RDMA) over Ethernet interfaces, Serial Advanced Technology Attachment (SATA) interfaces, Fibre Channel interfaces, Serial Attached SCSI (SAS) interfaces, and Non Volatile Memory Express (NVMe) interfaces.

5. The storage device of claim 1, having a form factor selected from the group consisting of a 3.5 inch hard drive form-factor, and a 2.5 inch hard drive form-factor.

6. The storage device of claim 1, wherein the storage device is configured, upon receiving a write request through the storage interface, to:
   first, store the write request in the second memory bank;
   second, execute the write request; and
   third, delete the write request from the second memory bank.

7. The storage device of claim 1, wherein the storage device is configured to concurrently:
   perform garbage collection in the first memory bank; and
   store write requests in the circular buffer.

8. The storage device of claim 7, wherein the storage device comprises a second controller configured to control operations in the first memory bank, and wherein the storage device is configured to:
   calculate a future buffering period, as a ratio of:
     an amount of free space in the circular buffer, and
     a maximum write rate for the second memory bank; and
   instruct the second controller to perform garbage collection operations during an interval of time having a length equal to the future buffering period.

9. The storage device of claim 7, wherein the storage device comprises a second controller configured to control operations in the first memory bank, and wherein the storage device is configured to:
   calculate a future buffering period, as a ratio of:
     an amount of free space in the circular buffer, and
     a maximum write rate for the second memory bank; and
   when a dirty block ratio of the first memory bank exceeds a first threshold, instruct the second controller to perform garbage collection operations during an interval of time having a length equal to the future buffering period.

10. The storage device of claim 9, wherein the storage device is further configured to:
    recalculate the future buffering period during the garbage collection operations, and
    when the recalculated future buffering period exceeds the previously calculated future buffering period, notify the second controller of the recalculated future buffering period.

11. The storage device of claim 1, wherein the storage device is configured, upon receipt of a write request for a location in the first memory bank, when the B-tree index contains a previously made index entry, and the second memory bank contains a corresponding write request, for the same location in the first memory bank:
- to store the write request in the circular buffer;
- to store an index entry for the write request in the B-tree index;
- to delete the previously made index entry from the circular buffer; and
- to delete the write request corresponding to the previously made index entry in the circular buffer.

12. The storage device of claim 1, wherein the storage device is configured, upon receipt of a read request for a location in the first memory bank, when the B-tree index contains a previously made index entry for the same location in the first memory bank:
- to respond to the read request with data from the circular buffer.

13. The storage device of claim 1, wherein the storage device is configured, when an empty fraction of the circular buffer falls below a threshold, to delay sending a command completion through the storage interface.

14. A method for operating a storage system, the storage system comprising a storage device comprising:
- a first memory bank including a plurality of slow nonvolatile memory cells;
- a second memory bank including a plurality of fast persistent memory cells; and
- a storage interface,
- each of the plurality of slow nonvolatile memory cells being:
  - at least ten times greater in read latency than any of the fast persistent memory cells; and
  - at least ten times greater in write latency than any of the fast persistent memory cells,
- the storage device including at least ten times as many of the slow nonvolatile memory cells as of the fast persistent memory cells,
- the method comprising:
  - receiving a write request through the storage interface;
  - storing the write request in a circular buffer in the second memory bank; and
  - storing an index entry for the write request in a B-tree index of write requests.

15. The method of claim 14, further comprising:
performing garbage collection in the first memory bank while storing the write request in the circular buffer.

16. A method for operating a storage system, the storage system comprising a storage device comprising:
- a first memory bank including a plurality of slow nonvolatile memory cells;
- a second memory bank including a plurality of fast persistent memory cells; and
- a storage interface,
- each of the plurality of slow nonvolatile memory cells being:
  - at least ten times greater in read latency than any of the fast persistent memory cells; and
  - at least ten times greater in write latency than any of the fast persistent memory cells,
- the storage device including at least ten times as many of the slow nonvolatile memory cells as of the fast persistent memory cells,
- the method comprising:
  - receiving a write request through the storage interface;
  - storing the write request in a circular buffer in the second memory bank;
  - performing garbage collection in the first memory bank while storing the write request in the circular buffer; and
  - storing an index entry for the write request in a B-tree index of write requests.

17. The method of claim 16, further comprising:
before storing the write request in the circular buffer,
calculating a future buffering period, as a ratio of:
- an amount of free space in the circular buffer, and
- a maximum write rate for the second memory bank,
wherein the performing of the garbage collection comprises performing garbage collection during an interval of time having a length equal to the future buffering period.

18. A storage system, comprising:
a plurality of storage devices, each comprising:
- a first controller;
- a first memory bank including a plurality of slow nonvolatile memory cells;
- a second memory bank including a plurality of fast persistent memory cells; and
- a storage interface,
- the first controller being configured to respond to input output requests received through the storage interface;
- each of the plurality of slow nonvolatile memory cells being:
  - at least ten times greater in read latency than any of the fast persistent memory cells; and
  - at least ten times greater in write latency than any of the fast persistent memory cells,
- the storage device including at least ten times as many of the slow nonvolatile memory cells as of the fast persistent memory cells,
- the storage system being configured to pool the respective second memory banks to form a virtual second memory bank,
- wherein a portion of the second memory bank is configured to operate as a circular buffer,
- wherein each storage device is configured, upon receiving a write request through the storage interface, to store the write request in the circular buffer, and
- wherein each storage device is further configured upon receiving the write request through the storage interface to store an index entry for the write request in a B-tree index of write requests.

* * * * *